(12) United States Patent
Wang et al.

(10) Patent No.: US 7,839,288 B2
(45) Date of Patent: Nov. 23, 2010

(54) SEALING DETECTION MECHANISM USING RFID TAG FOR CONTAINER

(75) Inventors: Chi-Hu Wang, Hsin Chu (TW);
Ching-Cheng Tien, Hsin Chu (TW);
Bore-Kuen Lee, Hsin Chu (TW);
Chi-Kuang Hwang, Hsin Chu (TW);
Chien-Jung Chiu, Hsin Chu (TW);
Chia-Wen Wu, Hsin Chu (TW);
In-Hang Chung, Hsin Chu (TW);
Tung-Chou Chen, Hsin Chu (TW);
Ming-Ching Yen, Hsin Chu (TW);
Jwu-E Chen, Hsin Chu (TW)

(73) Assignee: Chung Hua University, Hsin Chu (TW)

( * ) Notice: Subject to any disclaimer, the term of this patent is extended or adjusted under 35 U.S.C. 154(b) by 295 days.

(21) Appl. No.: 11/727,586

(22) Filed: Mar. 27, 2007

(65) Prior Publication Data

US 2007/0296599 A1    Dec. 27, 2007

(30) Foreign Application Priority Data

Jun. 26, 2006    (TW) .............................. 95122906 A
Jun. 26, 2006    (TW) .............................. 95122907 A

(51) Int. Cl.
*G08B 13/14* (2006.01)
(52) U.S. Cl. ................. 340/572.8; 340/572.1; 340/10.1; 340/10.5
(58) Field of Classification Search ................. 340/572, 340/10, 505
See application file for complete search history.

(56) References Cited

U.S. PATENT DOCUMENTS

| | | | | |
|---|---|---|---|---|
| 4,813,564 A * | 3/1989 | Cooper et al. ............... | 215/366 |
| 6,050,622 A * | 4/2000 | Gustafson ............... | 292/307 R |
| 6,137,413 A * | 10/2000 | Ryan, Jr. ................... | 340/572.8 |
| 6,271,753 B1 * | 8/2001 | Shukla ..................... | 340/545.6 |
| 6,604,643 B1 * | 8/2003 | Michael et al. ............. | 215/204 |
| 6,641,052 B2 * | 11/2003 | Baillod et al. ............... | 235/494 |
| 7,017,807 B2 * | 3/2006 | Kipp et al. .................. | 235/385 |
| 7,034,689 B2 * | 4/2006 | Teplitxky et al. ......... | 340/572.7 |
| 7,048,179 B2 * | 5/2006 | Claessens et al. ........... | 235/375 |
| 7,061,382 B2 * | 6/2006 | Claessens et al. ........ | 340/572.8 |
| 7,176,796 B2 * | 2/2007 | Chen et al. ............... | 340/568.1 |
| 7,342,501 B2 * | 3/2008 | Abbott ..................... | 340/572.8 |
| 7,364,089 B2 * | 4/2008 | Claessens et al. ........... | 235/492 |
| 7,388,506 B2 * | 6/2008 | Abbott ..................... | 340/572.8 |

(Continued)

*Primary Examiner*—Travis R Hunnings
(74) *Attorney, Agent, or Firm*—Rosenberg, Klein & Lee

(57) ABSTRACT

Disclosed is a sealing detection mechanism for detecting sealing of a closure fastened to a container having a top open end. The sealing detection mechanism includes a RFID tag mounted at a selected position of the closure, at least one operable tear portion formed at the closure, and at least one conductive unit electrically connected to the RFID tag and extended from the RFID tag to the closure to form a conductive circuit loop across the operable tear portion of the closure. A sealing guarantee device mounted is selectively mounted between the top open end of the container and the closure, which includes an upper portion, a lower portion, and a middle portion connected between the upper portion and the lower portion. The lower portion of the sealing guarantee device is provided with an annular flange protruding downward from the lower portion and a hollow portion between the lower portion and the flange.

15 Claims, 8 Drawing Sheets

U.S. PATENT DOCUMENTS

| | | | |
|---|---|---|---|
| 7,436,301 B2* | 10/2008 | Norman et al. | 340/568.1 |
| 7,479,887 B2* | 1/2009 | Meyer | 340/572.8 |
| 2005/0242957 A1* | 11/2005 | Lindsay et al. | 340/572.7 |
| 2007/0222232 A1* | 9/2007 | Held | 292/307 R |
| 2007/0296599 A1* | 12/2007 | Wang et al. | 340/572.8 |
| 2008/0149584 A1* | 6/2008 | Martinelli | 215/201 |

* cited by examiner

SEALING DETECTION MECHANISM USING RFID TAG FOR CONTAINER

FIELD OF THE INVENTION

The present invention relates to a sealing detection mechanism, and more particularly to a sealing detection mechanism using RFID tag that can indicate the sealing condition of a container and provide the product information to a RFID reader.

BACKGROUND OF THE INVENTION

Barcode reader is widely used in the industry for reading a message on a barcode adhered on an object. However, in operation, errors are frequently found, especially when the barcode reader is not closed enough to the barcode for detection. Moreover, it is required to project light on the barcode for the barcode reader to read.

Recently, radio frequency identification (RFID) techniques have been applied to many applications for easily obtaining messages on an object. The message is stored in a RFID tag and a signal is transmitted wirelessly from the RFID tag to a RFID reader within an effective transmission distance. A large amount of messages can be transmitted by radio frequency identification. It is very simple and convenient to read a message by RFID.

In WO 2006/049374A1, a RFID sensor is disclosed. The RFID sensor comprises a plurality of RFID chips for monitoring different objects e.g. gas valve, door, window and so on. The RFID reader transmits a radio frequency signal to the RFID sensor at a predetermined period, and receives a frequency signal having the unique number of the chosen RFID chip from the RFID sensor. Then the RFID reader transmits the signal to the controller to recognize the used state of the monitored object. The controller can provides the information, e.g. "the gas valve is open", to the user through a Personal Digital Assistance. The system also comprises a selection unit for choosing the chip by a physical or an electrical operation and connecting the chosen chip to the RFID antenna. Therefore, the accessing of information from the chips is controlled to assure safety. The system requires a plurality of RFID tags that increase the manufacture cost. Moreover, the system is unable to realize whether the RFID tags that are connected to the antenna work normally or not.

U.S. Pat. No. 6,486,780 discloses applications for radio frequency identification systems. RFID devices, including handheld RFID devices, and applications may be used in connections with items that are associated with an RFID tag, and optionally a magnetic security element. The devices and applications can be applied for management of books and materials in a library.

A multi-directional RFID antenna is disclosed in U.S. Pat. No. 6,069,564. The antenna provides multi-directional RF communication to a source, such as a RF tag, which comprises a plurality of coils for transmission of RF signals and a switch for selecting at least one of the RF antenna coils for transmission of the RF signal and receipt of the RF response signals whereby the RF signals can be directed toward and received from a plurality of different directions from a fixed position.

Passive RFID transponders or tags, instead of the conventional barcode tags, are used to communicate messages for product tracking. The use of passive RFID tags includes the mounting of the RFID tags in the packaging of wine bottles and corks in which the RFID tags carry anti-counterfeit and product-tracking information. Once the cork of a wine bottle is removed, the RFID tag mounted thereof is destroyed simultaneously; hence a RFID reader receives no signals from the destroyed RFID tag. It is also easy for the RFID reader to identify a counterfeit wine that would not send messages to the RFID reader. Hence, any opened wine or counterfeit wine is recognized and prevented. However, it is noted that once the RFID tag is destroyed, whether it is destroyed intentionally by the consumer or unintentionally by the manufacturing machine or workers, the RFID reader is not able to read any information from the RFID tag, and hence not able to track the product.

It is desired to develop a sealing detection mechanism using RFID tag that is able to indicate the sealing condition and provide the information of the product even though the sealing is damaged.

SUMMARY OF THE INVENTION

The primary object of the present invention, therefore, is to provide a sealing detection mechanism using RFID tag for incorporation to a closure suitable to be fastened to a container. A plurality of conductive units extends from the RFID tag. In accordance with the connection and disconnection of the conductive units, conductive codes or open-circuit codes are generated and transmitted to the RFID tag that is read by a RFID reader.

Another object of the present invention is to provide a sealing detection mechanism using RFID tag that comprises a plurality of conductive units extending from the RFID tag. A tear strip is provided, which extends across the conductive units. Upon pulling, the tear strip is easily torn that causes the breakage of the conductive units and the RFID tag generates open-circuit codes to indicate the damages of the sealing.

A further object of the present invention is to provide a sealing detection mechanism using RFID tag that comprises a plurality of conductive units. The conductive units may be partially or completely damaged upon the pulling of the tear strip. The degree of damage of the conductive units indicates the degree of the damage to the sealing. Through a RFID reader, the sealing condition can be inspected.

A yet further object of the present invention is to provide a sealing detection mechanism using RFID tag for incorporation to a closure. The RFID tag is arranged at a predetermined position, e.g. at the top end, of the closure. The unsealing of the closure breaks the conductive units, but it would not damage the RFID tag. Hence, the RFID tag remains effective and is able to provide the product information.

Another object of the invention is to provide a sealing detection mechanism with RFID tag and sealing guarantee device. The RFID tag is arranged at the sealing guarantee device. Upon sealing, the top open end of the container presses against the sealing guarantee device, and a conductive code is generated to indicate that the product is sealed.

A further object of the invention is to provide a sealing guarantee device which can be incorporated to suitable closures. The sealing guarantee device comprises a flange with a sharp end and a plurality of splits. The flange structure prevents leakage from the container and reveals the unsealing of the product.

To fulfill the above objects, the present invention provides a sealing detection mechanism using RFID tag for incorporation to a closure. The sealing detection mechanism comprises an RFID tag arranged at a predetermined position of the closure and at least one conductor unit extending from the RFID tag. The sealing detection mechanism includes a tear strip that extends across the conductive unit. When the conductive unit is connected, a conductive code is generated.

Upon the pulling of the tear strip, the conductive unit is damaged and an open-circuit code is generated. A RFID reader reads the signal from the RFID tag and indicates the sealing condition of the closure.

The sealing detection mechanism may further comprise a sealing guarantee device with an indentation between an upper section and a lower section. Upon sealing, the top open end of the container presses against the lower section, causing the connective unit at the upper section to connect with the connective unit at the lower section, and a conductive code is generated. The sealing detection mechanism also comprises a flange with splits. The flange prevents leakage from the container and reveals the unsealing of the product.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
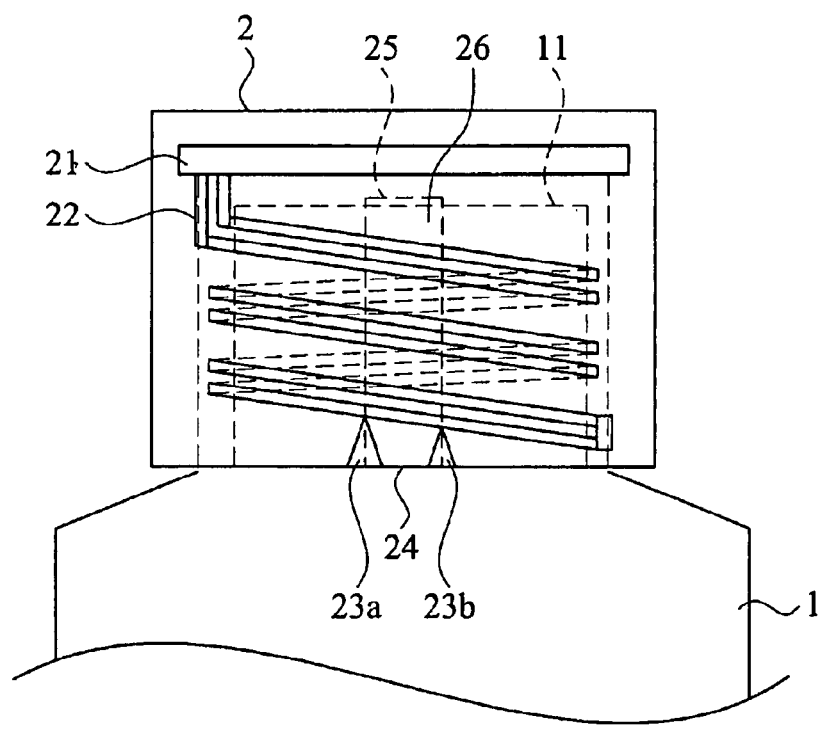
FIG. 1 is a schematic side view showing a closure incorporated with a sealing detection mechanism using RFID tag constructed in accordance with a first embodiment of the present invention.

With reference to the drawings and in particular to FIG. 1, FIG. 1 is a schematic side view showing a closure incorporated with a sealing detection mechanism using RFID tag constructed in accordance with a first embodiment of the present invention. A container 1 is used for the accommodation of substances that may be in liquid form or solid form and has a top open end 11 to be closed by a closure 2. The container 1 may be made of any rigid materials like glasses, plastics, or metal. The closure 2 is provided with a fastening structure and may be fastened by any conventional way to the container 1 or removed from the container 1. The closure 2 may be made of any materials that enable the tight sealing of the closure 2 to the container 1.

The closure 2 is incorporated with a sealing detection mechanism of the present invention. The sealing detection mechanism comprises a RFID tag 21 arranged at a predetermined position at the closure 2 and a plurality of conductive units 22 extending from the RFID tag 21. For example, the RFID tag 21 is mounted to an internal space at the bottom surface of the top plate of the closure 2. The RFID tag 21 stores the information of the product, e.g. the sealing condition, the price, the expiration date, product number and so on. The RFID tag 21 may be a known active RFID tag or a passive RFID tag. Preferably, passive RFID tag is used, which is cheaper in cost and does not require any power supply.

The conductive units 22 are parallelly arranged and spaced from each other with a predetermined distance. The conductive units 22 may be arranged at any part of the closure 2. In the first embodiment, the conductive units 22 are embedded in the closure 2. The number of conductive units 22 used depends on the precision requirement in practice. As shown in FIG. 1, the conductive units 22 have a helical structure extending spirally downward from the RFID tag 21 and surrounding on an inner wall surface of the closure 2. The conductive units 22 may be made of pliable electrically conductive material. Preferably, the conductive units 22 are made of metallic materials such as aluminum, copper, alloy, or transparent conducting glue.

The sealing detection mechanism also includes other electrical components (not shown). Each of the conductive units 22 is connected with the electrical components to form a conductive circuit loop. Hence, the number of conductive circuit loops formed is equal to the number of the conductive units 22. When the RFID tag 21 and the conductive unit 22 are properly connected, the conducting circuit loop is in a closed state, and a conductive code is generated. When the conducting circuit loop is in an open state, resulting from the fracture of the conductive unit 22, an open-circuit code is generated. Both the conductive codes and the open-circuit codes are detected by the RFID tag 21.

In the case that an electrically conductive closure, e.g. a metallic closure, is used, it is needed to insert an electrically insulating layer to electrically separate the conductive units 22 and the closure 2.

The closure 2 is provided with an operable tear portion including two inverted V-shaped notches 23a, 23b at the bottom edge of closure 2. The bottom edge between the two V-shaped notches 23a, 23b forms a tear tab 24 that facilitates the user to pull. Moreover, the operable tear portion includes at least a tear line. For example, the wall of the closure 2 is preferably formed with a tear line 25 which has a substantially thinner wall thickness and can be easily broken upon acting of force. The tear line 25 extends from one V-shaped notch 23a vertically up to the upper section of the closure 2 and then extends horizontally for a predetermined distance. Finally, the tear line 25 extends downward to the other V-shaped notch 23b. The longitudinal part surrounded by the tear line 25 forms an easy tear strip 26. Upon the pulling of the tear tab 24 by the user, the tear strip 26 is easily torn along the tear line 25. Thereby, the user can remove the tear strip 26 completely and then open the closure 2 from the container 1 to reveal the contents of the container 1 or to obtain the substances in the container 1.

It can be seen from the drawing that the tear line 25 extends across the conductive units 22, but the tear line 25 does not extend across the RFID tag 21. When the tear strip 26 is torn, the conductive units 22 are simultaneously broken. In some situations, the conductive units 22 may be partially damaged when only a part of the tear strip 26 is pulled by an external force, while in some situations, the conductive units 22 may be completely damaged when the tear strip 26 is wholly removed. The degree of the damage of the conductive units 22 indicates the degree of unsealing of the closure 2.

When the closure 2 is not properly sealed or when the closure 2 is damaged, one or more conductive units are broken, and these damaged conducting circuit loops become open state. Each of the damaged conducting circuit loops generates an open-circuit code. Both the conductive codes and the open-circuit codes are detected by the RFID tag 21. A signal is generated at the RFID tag 21, which represents the sealing condition of the closure 2. A RFID reader can detect the sealing condition of the closure 2 by reading the signal transmitted from the RFID tag 21.

In practice, multiple ways of encoding the conductive code and the open-circuit code may be adopted. For example, the conductive code (generated when the conducting circuit loop is in a closed state) may be a "0" in the binary code system, while the open-circuit (generated when the conducting circuit loop is in an open state) may be a "1". For a sealing detection mechanism provided with multiple numbers of codes, e.g. four codes, a signal of "0000" represents a perfectly sealed product, while a signal of "1111" represents an opened product. Each "1" represents a flaw of the sealing. From the position of the "1", the inspector can find out the locations of the damages at the sealing.

The helical shaped conductive units 22 are sensitive and precise in revealing the sealing condition of a product. It is noted that, the tear off of the tear strip 26 would damage the conductive units 22, but it would not damage the RFID tag 21. In other words, the RFID tag 21 is still effective in providing the product information to the RFID reader and for tracking of the product even though the sealing is broken.

Figure 2:
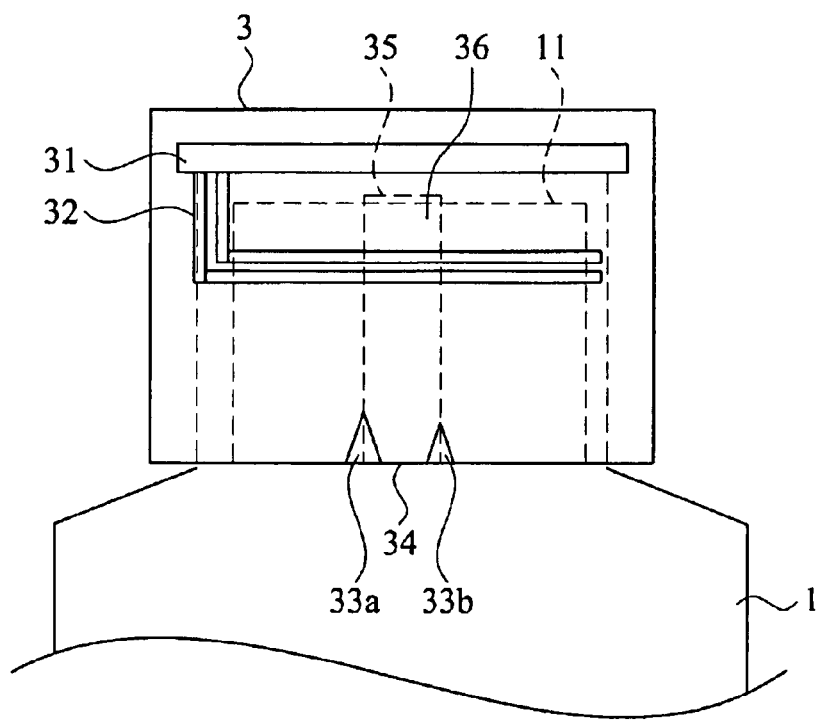
FIG. 2 is a schematic side view showing a closure incorporated with a sealing detection mechanism using RFID tag constructed in accordance with a second embodiment of the present invention.

Please refer to FIG. 2. FIG. 2 is a schematic side view showing a closure incorporated with a sealing detection mechanism using RFID tag constructed in accordance with a second embodiment of the present invention. In this embodiment, a container 1 with a top open end 11 may be closed by a closure 3. The closure 3 is incorporated with a sealing detection mechanism of the present invention. The sealing detection mechanism comprises a RFID tag 31 arranged at a predetermined position at the closure 3 and a plurality of conductive units 32 extending from the RFID tag 31.

The conductive units 32 have a L-shaped structure. The conductive units 32 extend downward from the RFID tag 31 with a vertical section and then bend perpendicularly to a horizontal section. Similar to the first embodiment, the closure 3 is provided with two inverted V-shaped notches 33a, 33b and a tear line 35 with thinner wall thickness. The longitudinal part surrounded by the tear line 35 forms an easy tear strip 36 and extends across the conductive units 32. Upon the pulling of a tear tab 34 by the user, the tear strip 36 is easily torn along the tear line 35 and the conductive units 32 are broken. A signal representing the sealing condition of the product is generated at the RFID tag 31.

Figure 3:
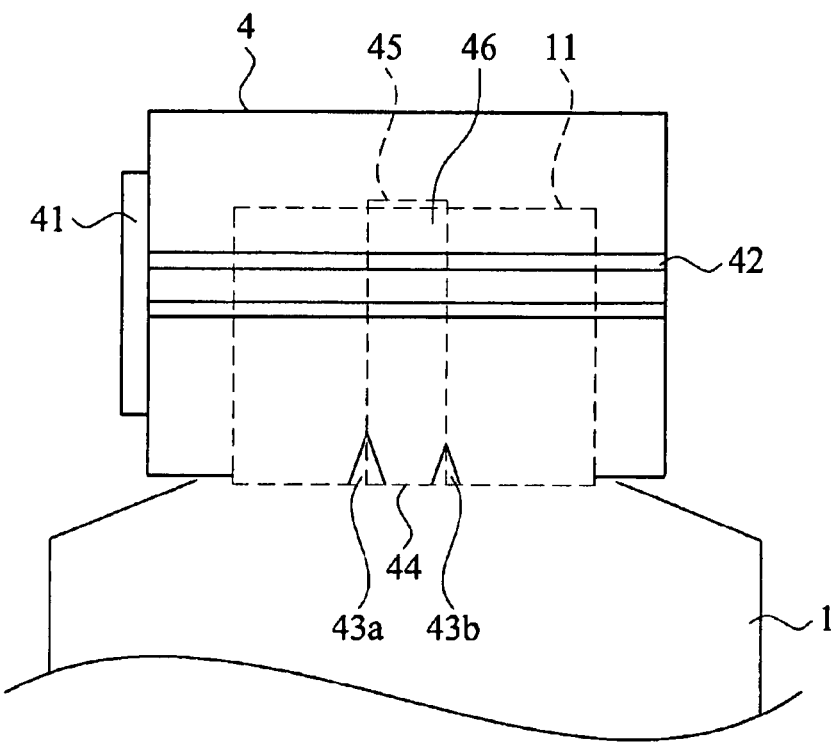
FIG. 3 is a schematic side view showing a closure incorporated with a sealing detection mechanism using RFID tag constructed in accordance with a third embodiment of the present invention.

FIG. 3 is a schematic side view showing a closure incorporated with a sealing detection mechanism using RFID tag constructed in accordance with a third embodiment of the present invention. In this embodiment, a RFID tag 41 is arranged vertically at a specific position at the rim of the closure 4 and a plurality of conductive units 42 extend from the RFID tag 41 horizontally and fully around the closure 4. Similar to the first embodiment, the closure 4 is provided with two inverted V-shaped notches 43a, 43b and a tear line 45 with thinner wall thickness. The longitudinal part surrounded by the tear line 35 forms an easy tear strip 46 and extends across the conductive units 42. Upon the pulling of a tear tab 44 by the user, the tear strip 46 is easily torn along the tear line 45 and the conductive units 42 are broken. A signal representing the sealing condition of the product is generated at the RFID tag 41.

Figure 4:
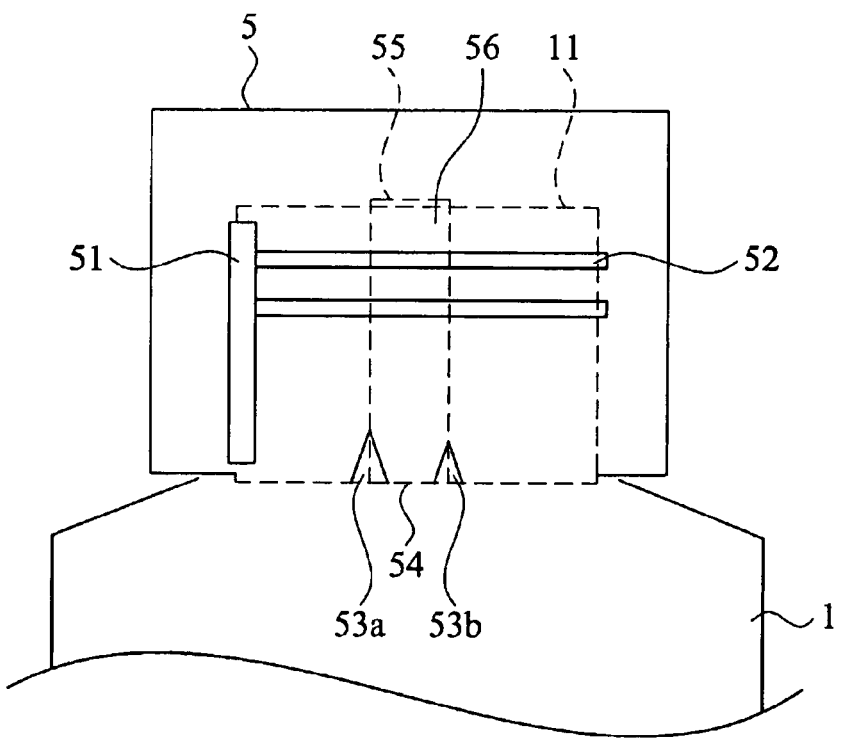
FIG. 4 is a schematic side view showing a closure incorporated with a sealing detection mechanism using RFID tag constructed in accordance with a fourth embodiment of the present invention.

FIG. 4 is a schematic side view showing a closure incorporated with a sealing detection mechanism using RFID tag constructed in accordance with a fourth embodiment of the present invention. In this embodiment, a RFID tag 51 is arranged vertically at a specific position at an inner wall surface of a closure 5 and a plurality of conductive units 52 extend from the RFID tag 51 horizontally and fully around the closure 5. Similar to the first embodiment, the closure 5 is provided with two inverted V-shaped notches 53a, 53b and a tear line 55 with thinner wall thickness. The longitudinal part surrounded by the tear line 55 forms an easy tear strip 56 and extends across the conductive units 52. Upon the pulling of a tear tab 54 by the user, the tear strip 56 is easily torn along the tear line 55 and the conductive units 52 are broken. A signal representing the sealing condition of the product is generated at the RFID tag 51.

It should be noted that although a plurality of conductive units are used in the embodiments, a single conductive unit is sufficient for the detection of the unsealing of the closure. Since the cost for manufacturing the conductive unit is low, preferably, a plurality of conductive units are used to enhance the precision of the inspection. The number and the arrangement of the RFID tag and the conductive units may be modified to enable the inspector to identify the locations of damages at the closure or to provide different inspection to the product.

Figure 5:
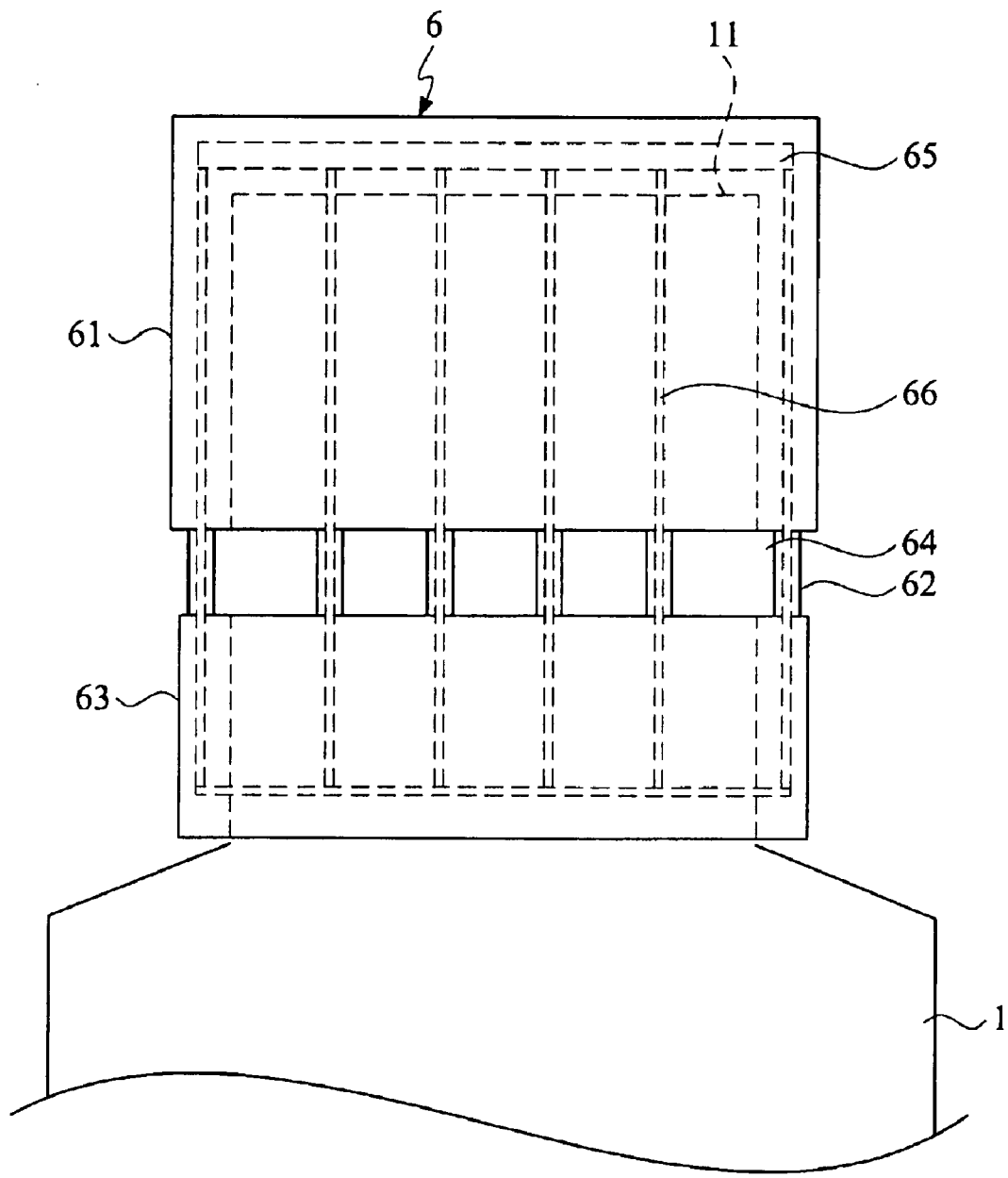
FIG. 5 is a schematic side view showing a closure incorporated with a sealing detection mechanism using RFID tag constructed in accordance with a fifth embodiment of the present invention.

FIG. 5 is a schematic side view showing a closure incorporated with a sealing detection mechanism using RFID tag constructed in accordance with a fifth embodiment of the present invention. A closure 6 has an upper section 61, a middle section 62 and a lower section 63. The upper section 61 has a top end (not labeled). The middle section 62 is perforated with a plurality of open areas 64. The upper section 61 is connected with the lower section 63 through the middle section 62. The lower section 63 is securely fixed to the container 1. Preferably, the lower section 63 is made of heat shrinkable material.

Figure 6:
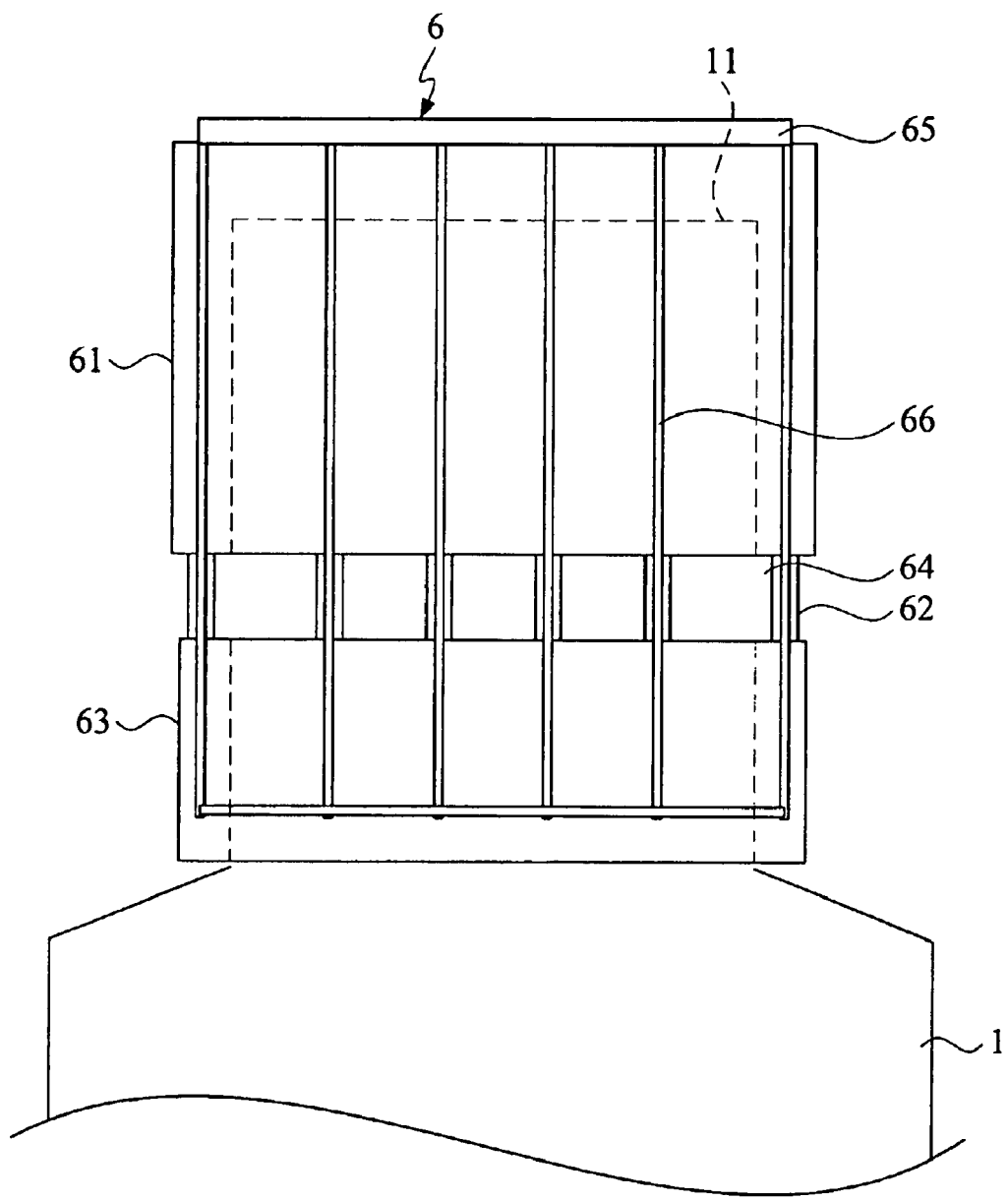
FIG. 6 is a schematic side view showing a closure incorporated with a sealing detection mechanism using RFID tag constructed in accordance with a sixth embodiment of the present invention.

The sealing detection mechanism in this embodiment comprises a RFID tag 65 and a plurality of conductive units 66. The conductive units 66 extend from the RFID tag 65 downward, through the upper section 61 and the middle section 62, to the lower section 63 of the closure 6. The RFID tag 65 may be mounted to an internal space at the bottom surface of the top plate of the closure 6, as shown in FIG. 5. Alternatively, the RFID tag 65 may be arranged vertically at a specific position at the outside surface of the closure 6, as shown in FIG. 6 which shows a closure incorporated with a sealing detection mechanism using RFID tag constructed in accordance with a sixth embodiment of the present invention.

Due to the physical structure, the middle section 62 is comparatively weaker in strength for resisting forces. When someone turns the closure 6, as the lower section 63 is stably mounted to the container 1 and would not displace, the torsion acting on the middle section 62 would cause the breakage of the middle section 62. Therefore, the conductive units 66 at the middle section 62 are also damaged and open-circuit codes are generated. Subsequently, a signal representing the sealing condition of the product is generated at the RFID tag 65.

The sealing detection mechanism may further comprise a sealing guarantee device. The sealing guarantee device is used to secure the sealing between the container and the closure. Please refer to FIG. 7 that shows a cross sectional view of the sealing guarantee device 7 in accordance with a seventh embodiment of the present invention. The sealing guarantee device 7 is made of elastic material and is provided with an upper portion 71, a middle portion 72 and a lower portion 73. The upper portion 71 and the lower portion 73 have an identical diameter, while the middle portion 72 has a significant smaller diameter. Hence, an indentation 74 is formed between the upper portion 71 and the lower portion 73. Also, the lower portion 73 comprises an annular flange 75 protruding downward from the lower portion 73 and a hollow portion 76 between the lower portion 73 and the flange 75.

Figure 7:
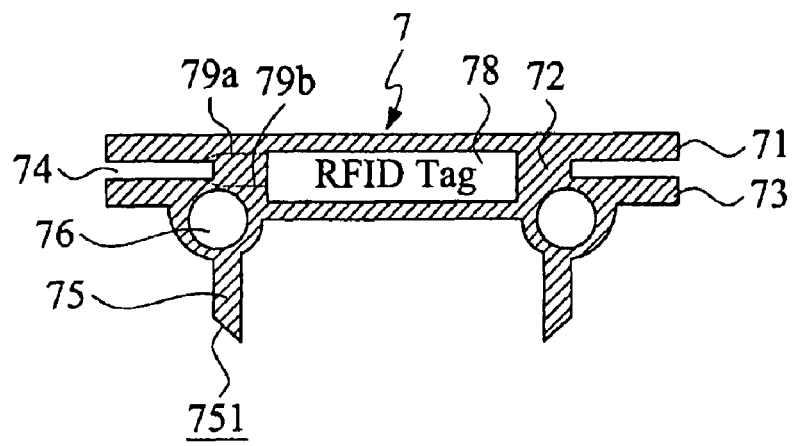
FIG. 7 is a cross-sectional view of the sealing guarantee device in accordance with a seventh embodiment of the present invention.
Figure 8:
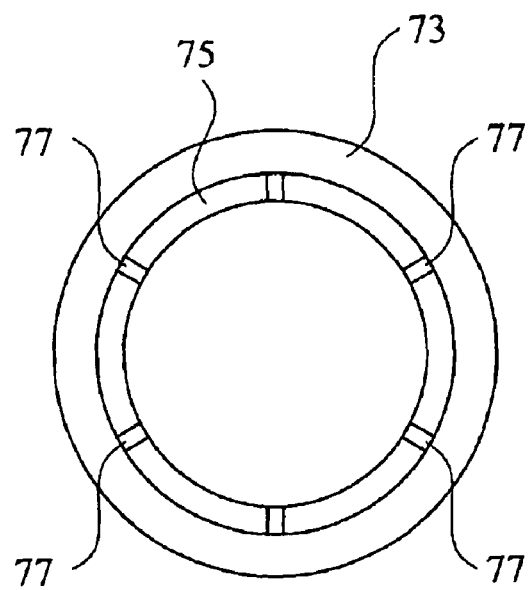
FIG. 8 is a bottom plane view of the sealing guarantee device shown in FIG. 7, showing that a RFID tag is arranged in an internal space of the sealing guarantee device.

FIG. 8 is a bottom plane view of the sealing guarantee device shown in FIG. 7, showing that a RFID tag is arranged in an internal space of the sealing guarantee device. The flange 75 has a sharp end and is arranged with a plurality of splits 77, as shown in FIG. 8. Further, the lower end of the flange 75 is preferably formed with a guided surface 751.

A RFID tag 78 is mounted in the sealing guarantee device 7. Two conductive units 79a and 79b extend from the RFID tag 78. The first conductive unit 79a extends to a spot near the periphery of the upper portion 71. The second conductive unit 79b extends to a spot near the periphery of the lower portion 73. The peripheral bottom surface of the upper portion 71 is coated with conductive material and electrically connected to the first conductive unit 79a, and the peripheral top surface of the lower portion 73 is coated with conductive material and electrically connected to the second conductive unit 79b.

Figure 9:
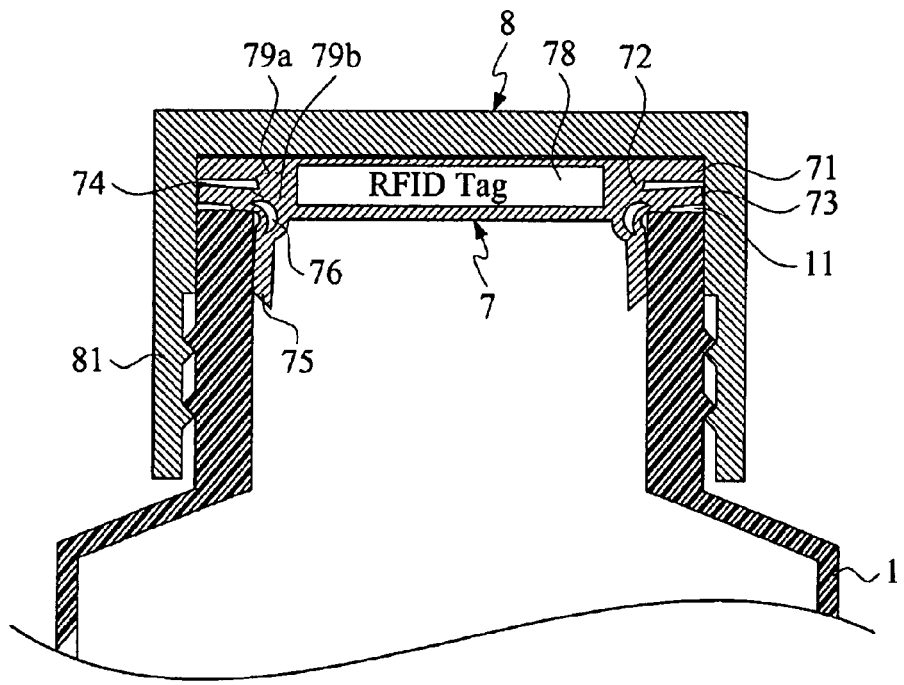
FIG. 9 is a cross-sectional view showing that a container is sealed with a closure incorporated with the sealing guarantee device with a RFID tag constructed in accordance with the seventh embodiment of the present invention shown in FIG. 7.

The sealing guarantee device 7 may be tightly mounted in the inner top surface of a casing 81 of a closure 8, as shown in FIG. 9. The casing 81 is provided with inner threads that mate with the outer threads of the container 1, enabling the closure 8 to be repeatedly fastened to and removed from the container 1 by screwing. The sealing detection mechanism in this embodiment includes a RFID tag 78, two conductive units 79a, 79b, and the sealing guarantee device 7.

Please refer to FIG. 9, which is a cross-sectional view showing that a container is sealed with a closure incorporated with the sealing guarantee device with a RFID tag constructed in accordance with the seventh embodiment of the present invention shown in FIG. 7. When the closure 8 is screwed to the container 1, the top open end 11 of the container 1 fits exactly into the space between the flange 75 and the inner wall of the casing 81. At sealing, the top open end 11 presses against the lower portion 73. Such a movement causes the lower portion 73 to displace upward and the hollow portion 76 is squeezed and distorted. Subsequently, the lower portion 73 contacts the upper portion 71. When the lower portion 73 contacts with the upper portion 71, a conductive circuit loop is in a closed state, and a conductive code is detected by the RFID tag 78 through the conductive units 79a and 79b, indicating that the closure is properly sealed.

The upward displacement of the lower portion 73 would physically cause the outward displacement of the flange 75. It can be clearly seen from FIG. 9 that the outer wall of the top open end 11 contacts the inner wall of the casing 81, the top edge of the top open end 11 closely contacts with the lower portion 73 and the flange 75 closely contacts the inner wall of the top open end 11. These multiple contacts efficiently prevent the leakage of any substances from the container 1.

When the closure 8 is loosely fastened to the container 1 or when the closure 8 is opened, the lower portion 73 would not contact the upper portion 71, and hence the two conductive units 79a, 79b are disconnected. The conductive circuit loop becomes open state, and an open-circuit code is generated.

When the RFID tag 78 receives the conductive code, it sends a sealing signal to the RFID reader, but when the RFID tag 78 receives the open-circuit code, it sends an unsealing signal to the RFID reader.

Figure 10:
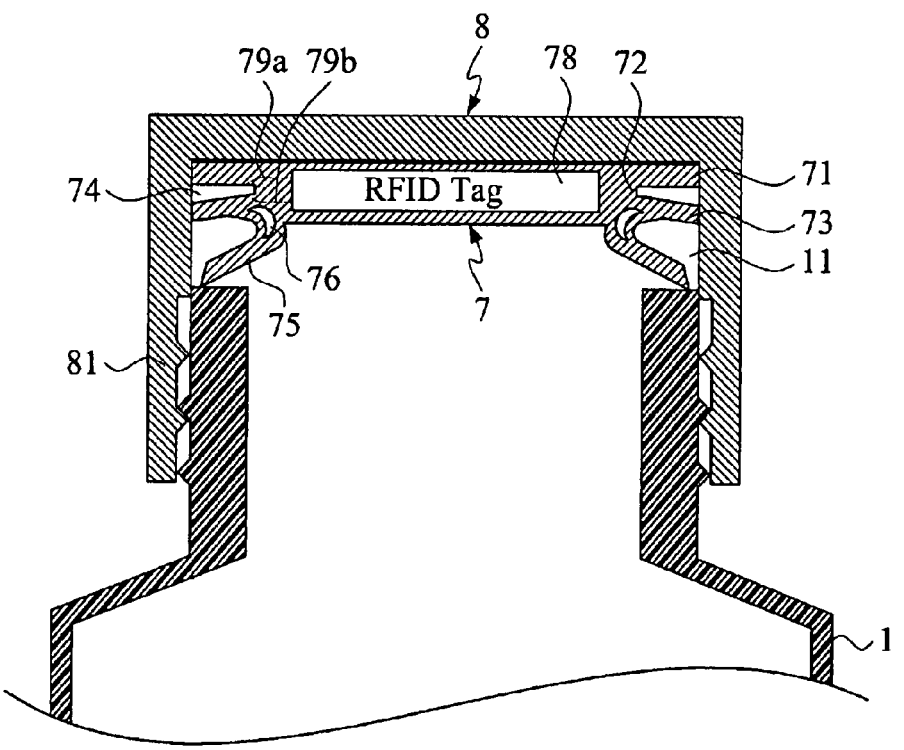
FIG. 10 is a cross-sectional view showing the closure of FIG. 9 is unsealed and fastened again to the container, causing a deformation to the sealing guarantee device.

It is noted that the sealing of the top open end 11 to the lower portion 73 may cause the permanent distortion of the hollow portion 76. After the closure 8 is unfastened, the sealing guarantee device 7 cannot completely restore to it original structure and the flange 75 displaces slightly outward from its original position. As shown in FIG. 10, when the closure 8 is screwed again to the container 1, because the flange 75 is designed with splits 77 and guided surface 751, the flange 75 is led by the torsion to displace outward and upward, blocking the top open end 11 of the container 1 from touching the lower portion 73. Therefore, when the closure 8 is unsealed and then fastened back to the container 1, the lower portion 73 remains separated from the upper portion 71, and an open-circuit code is generated. Subsequently, the RFID reader detects an unsealing message from the RFID tag 78.

In practice, the sealing guarantee device may be embedded with a RFID tag therein as disclosed above, or arranged at a specific position at an outside surface of the sealing guarantee device. Alternatively, the sealing guarantee device may be mounted in a closure without RFID tag, serving as simple sealing guarantee purpose for a container.

Figure 11:
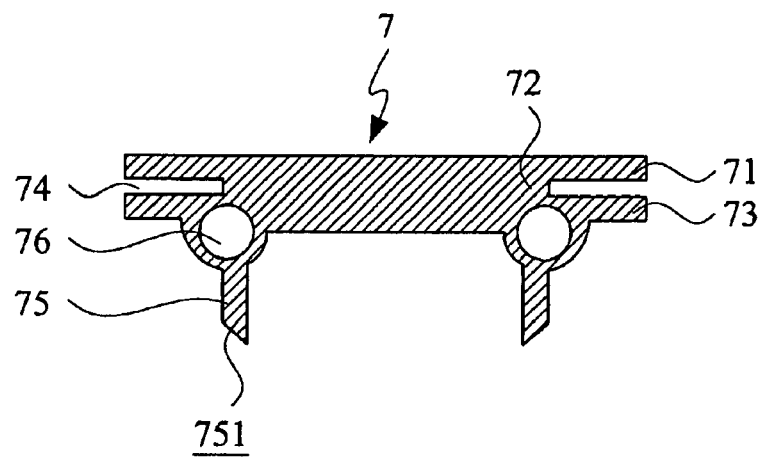
FIG. 11 is a cross-sectional view of the sealing guarantee device in accordance with an eighth embodiment of the present invention.
Figure 12:
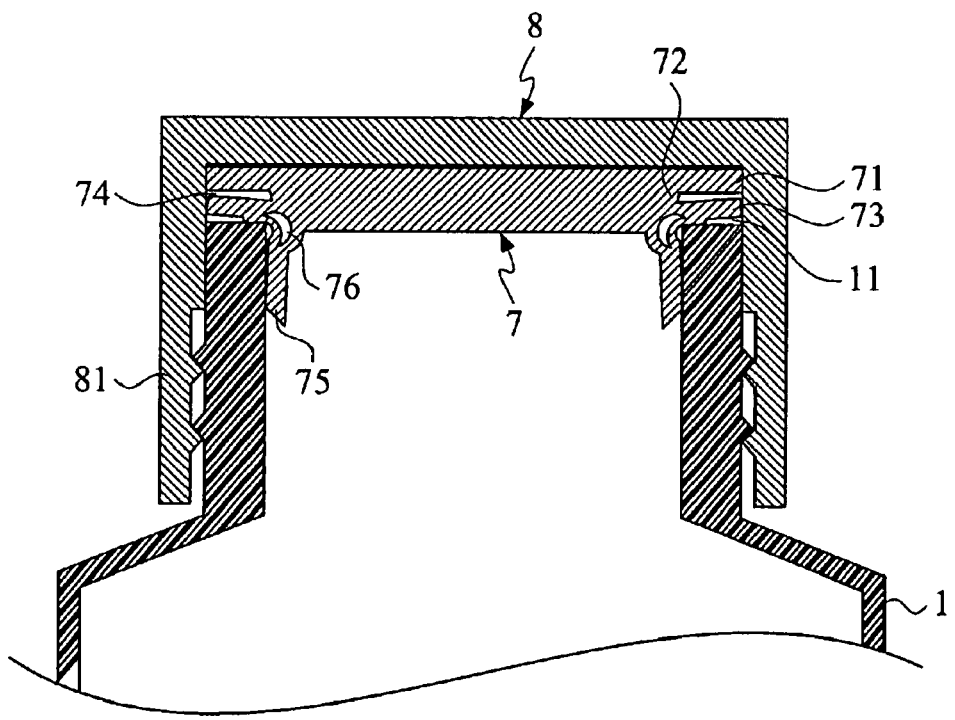
FIG. 12 is a cross-sectional view showing that a container is sealed with a closure incorporated with the sealing guarantee device with a RFID tag constructed in accordance with the eighth embodiment of the present invention shown in FIG. 11.
Figure 13:
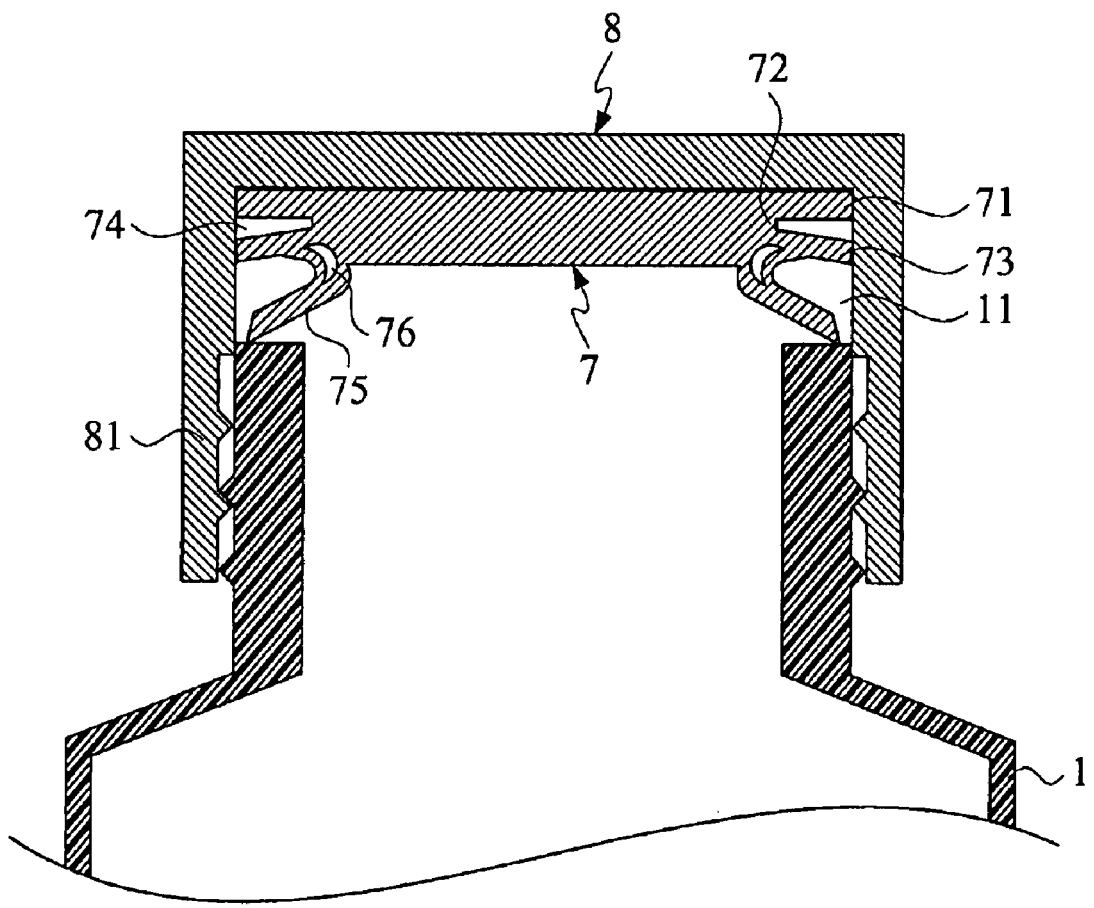
FIG. 13 is a cross-sectional view showing the closure of FIG. 12 is unsealed and fastened again to the container, causing a deformation to the sealing guarantee device.

With reference to FIG. 11, which is a cross-sectional view of the sealing guarantee device in accordance with an eighth embodiment of the present invention, illustrating a simplified sealing guarantee device 7a without RFID tag. FIG. 12 is a cross-sectional view showing that a container is sealed with a closure incorporated with the sealing guarantee device with a RFID tag constructed in accordance with the eighth embodiment of the present invention shown in FIG. 11. FIG. 13 is a cross-sectional view showing the closure of FIG. 12 is unsealed and fastened again to the container, causing a deformation to the sealing guarantee device.

Similar to the previous embodiment described above, the simplified sealing guarantee device 7a is composed of an upper portion 71, a middle portion 72 and a lower portion 73. The upper portion 71 and the lower portion 73 have an identical diameter, while the middle portion 72 has a significant smaller diameter. Hence, an indentation 74 is formed between the upper portion 71 and the lower portion 73. Also, the lower portion 73 comprises an annular flange 75 protruding downward from the lower portion 73 and a hollow portion 76 between the lower portion 73 and the flange 75. The flange 75 has a sharp end and is formed with a plurality of splits 77. The lower end of the flange 75 is preferably formed with a guided surface 751.

When the closure 8 is screwed to the container 1, as shown in FIG. 12, the top open end 11 of the container 1 fits exactly into the space between the flange 75 and the inner wall of the casing 81. At sealing, the top open end 11 presses against the lower portion 73. Such a movement causes the lower portion 73 to displace upward and the hollow portion 76 is squeezed and distorted. Subsequently, the lower portion 73 contacts the upper portion 71.

The upward displacement of the lower portion 73 would physically cause the outward displacement of the flange 75. It can be clearly seen from FIG. 12 that the outer wall of the top open end 11 contacts the inner wall of the casing 81, the top edge of the top open end 11 closely contacts with the lower portion 73 and the flange 75 closely contacts the inner wall of the top open end 11. These multiple contacts efficiently prevent the leakage of any substances from the container 1.

The sealing of the top open end 11 to the lower portion 73 causes the permanent distortion of the hollow portion 76. After the closure 8 is unfastened, the sealing guarantee device 7 cannot completely restore to it original structure and the flange 75 displaces slightly outward from its original position.

As shown in FIG. 13, when the closure 8 is screwed again to the container 1, because the flange 75 is designed with splits 77 and guided surface 751, the flange 75 is led by the torsion to displace outward and upward, blocking the top open end 11 of the container 1 from touching the lower portion 73. Therefore, when the closure 8 is unsealed and then fastened back to the container 1, the lower portion 73 remains separated from the upper portion 71. The flange structure can be applied to any suitable closure to provide leak-proof and to guarantee proper sealing of the closure.

The present invention has been described with some preferred embodiments thereof and it is understood that many changes and modifications in the described embodiments can be carried out without departing from the scope and the spirit of the invention that is to be limited only by the appended claims.

What is claimed is:

1. A sealing detection mechanism for detecting a condition of a seal of a closure fastened to a container having a top open end, said detection mechanism comprising:
   an RFID tag mounted at a selected position of the closure;
   at least one operable tear portion formed at the closure, the operable tear portion being provided with two inverted V-shaped notches at a bottom edge of the closure, a tear tab thereby being formed between two V-shaped notches; and
   at least one conductive unit electrically connected to the RFID tag and extended from the RFID tag to the closure to form a closed conductive circuit loop across the operable tear portion of the closure;
   wherein (1) when the closure is properly sealed on the top open end of the container, the conducting circuit loop forms a closed circuit and the RFID tag is operable to transmit a conductive code to an RFID reader; and (2) when the closure is not properly sealed or is, damaged, broken, or removed from the container, the conducting circuit loop forms an open circuit defining is in an open state, resulting from the fracture of the operable tear portion, and the RFID tag transmits an open-circuit code to the RFID reader.

2. The sealing detection mechanism as claimed in claim 1, wherein the RFID tag is horizontally mounted to an internal space of the closure.

3. The sealing detection mechanism as claimed in claim 1, wherein the RFID tag is vertically mounted to an internal space of the closure.

4. The sealing detection mechanism as claimed in claim 1, wherein the RFID tag is arranged at an outer surface of the closure.

5. The sealing detection mechanism as claimed in claim 1, wherein the conductive unit has a helical structure extending spirally downward from the RFID tag and surrounding an inner wall surface of the closure.

6. The sealing detection mechanism as claimed in claim 1, wherein the conductive unit has a L-shaped structure extending downward from the RFID tag with a vertical section and then bend perpendicularly to a horizontal section and surrounding an inner wall surface of the closure.

7. The sealing detection mechanism as claimed in claim 1, wherein the conductive unit extends from the RFID tag horizontally and around the closure.

8. The sealing detection mechanism as claimed in claim 1, wherein the conductive unit is made of electrically conductive material selected from one of aluminum, copper, alloy and transparent conducting glue.

9. The sealing detection mechanism as claimed in claim 1, wherein the operable tear portion comprises a tear line extending from a bottom edge of the closure vertically up to an upper section of the closure and then extending horizontally for a predetermined distance, and finally extending downward to the bottom edge of the closure.

10. The sealing detection mechanism as claimed in claim 1, wherein the RFID tag is arranged at an outer surface of the closure.

11. The sealing detection mechanism as claimed in claim 1, wherein the conductive unit is made of electrically conductive material selected from one of aluminum, copper, alloy and transparent conducting glue.

12. A sealing detection mechanism for detecting a condition of a seal of a closure fastened to a container having a top open end, said detection mechanism comprising:
   a sealing guarantee device mounted between the top open end of the container and the closure, the sealing guarantee device further including:
      an upper portion contacting with the closure;
      a lower portion having an annular flange protruding downward from the lower portion and a hollow portion formed between the lower portion and the flange; and
      a middle portion connected between the upper portion and the lower portion;
   wherein when the closure is sealed on the top open end of the container, the lower portion of the sealing guarantee device is pressed against the top open end of the container and thereby the hollow portion is squeezed to cause a permanent distortion of the hollow portion and an outward displacement of the flange; when the closure is unfastened, the flange displaces outwardly whereby, when the closure is attempted to be re-coupled to the container, the flange is operable to block the top open end of the container from engaging the lower portion of the sealing guarantee device.

13. The sealing detection mechanism as claimed in claim 12, wherein the flange is further formed with a plurality of splits.

14. The sealing detection mechanism as claimed in claim 12, wherein the flange is further formed with a guided surface at a lower end thereof.

15. The sealing detection mechanism as claimed in claim 12, further comprising:

an RFID tag mounted in the sealing guarantee device;
an indentation formed between the upper portion and the lower portion;
a first conductive unit extending from the RFID tag to the upper portion of the sealing guarantee device; and
a second conductive unit extending from the RFID tag to the lower portion of the sealing guarantee device;
wherein when the closure is sealed on the top open end of the container, the lower portion of the sealing grantee device is pressed against the top open end of the container, the lower portion contacts with the upper portion and thereby a conducting circuit loop is in a closed state and the RFID tag is operable to transmit a conductive code; when the closure is removed from the container, the lower portion is separated from the upper portion and the conducting circuit loop is in an opened state, and the RFID tag remains operable to transmit an open-circuit code.

\* \* \* \* \*